(12) United States Patent
Jevaney et al.

(10) Patent No.: US 10,533,374 B2
(45) Date of Patent: Jan. 14, 2020

(54) LOADING APPARATUS WITH PIVOTING HANDLE

(71) Applicant: Randall Manufacturing LLC, Elmhurst, IL (US)

(72) Inventors: Fred Jevaney, Elmhurst, IL (US); Adam Giemza, Elmhurst, IL (US)

(73) Assignee: Randall Manufacturing LLC, Elmhurst, IL (US)

( * ) Notice: Subject to any disclaimer, the term of this patent is extended or adjusted under 35 U.S.C. 154(b) by 0 days.

(21) Appl. No.: 15/421,858

(22) Filed: Feb. 1, 2017

(65) Prior Publication Data

US 2018/0215304 A1 Aug. 2, 2018

(51) Int. Cl.
*E06C 5/20* (2006.01)

(52) U.S. Cl.
CPC ..................... *E06C 5/20* (2013.01)

(58) Field of Classification Search
CPC ... E06C 5/02; E06C 5/04; E06C 7/182; E06C 9/08; B63B 27/14
See application file for complete search history.

(56) References Cited

U.S. PATENT DOCUMENTS

| | | | | |
|---|---|---|---|---|
| 298,212 A * | 5/1884 | knight | ..................... | B63B 27/14 182/1 |
| 712,262 A * | 10/1902 | cody | ........................ | E06C 9/08 182/86 |
| 1,628,505 A * | 5/1927 | lundquist | ............... | B61D 23/02 105/448 |
| 2,303,078 A * | 11/1942 | Hull | ........................ | E06C 7/182 182/106 |
| 2,864,542 A * | 12/1958 | Marryatt | ................. | B63B 27/14 182/21 |
| 3,139,155 A * | 6/1964 | Skeels | ...................... | E06C 7/182 182/106 |
| 3,858,905 A * | 1/1975 | Peebles | ................... | B60R 3/007 280/163 |
| 4,168,764 A * | 9/1979 | Walters | ................... | B63B 27/14 182/1 |
| 4,293,055 A * | 10/1981 | Hooser | ................... | E06C 7/183 182/106 |
| 4,583,466 A * | 4/1986 | Reddy | .................... | B61D 23/02 105/443 |
| 6,003,633 A * | 12/1999 | Rolson | ...................... | E06C 5/02 182/106 |
| 6,116,378 A * | 9/2000 | Barrow | ..................... | B60R 3/02 182/127 |
| 6,379,102 B1 * | 4/2002 | Kameda | ................... | A61G 3/06 414/546 |
| 6,401,861 B1 * | 6/2002 | Marszalek | ............... | B60R 3/02 182/206 |

(Continued)

FOREIGN PATENT DOCUMENTS

| WO | WO 2015119505 A1 * | 8/2015 | ............... | E06C 9/08 |
|---|---|---|---|---|
| WO | WO-2015119505 A1 * | 8/2015 | ............... | E06C 7/12 |

*Primary Examiner* — Catherine A Kelly
*Assistant Examiner* — Candace L Bradford
(74) *Attorney, Agent, or Firm* — Brinks Gilson & Lione (57) ABSTRACT

A loading apparatus is provided that includes a set of stairs, a platform, and a handle. The stairs are attached to the platform and the platform has a locking mechanism. The handle has a first end that is pivotally attached to the set of stairs and the locking mechanism is capable of engaging the handle.

18 Claims, 6 Drawing Sheets

(56) References Cited

U.S. PATENT DOCUMENTS

| | | | |
|---|---|---|---|
| 7,025,174 B1 * | 4/2006 | Hawley | B60R 3/02 |
| | | | 182/127 |
| 7,225,896 B2 * | 6/2007 | Broad | E06C 7/182 |
| | | | 105/443 |
| 7,229,116 B1 * | 6/2007 | Bruford | B60P 3/40 |
| | | | 296/26.08 |
| 7,516,997 B2 * | 4/2009 | Kuznarik | B62D 33/0273 |
| | | | 182/127 |
| 7,530,619 B1 * | 5/2009 | Bruford | B60R 3/02 |
| | | | 296/1.02 |
| 8,075,008 B1 * | 12/2011 | Hanser | B60R 3/02 |
| | | | 182/88 |
| 8,257,008 B2 | 9/2012 | Ellingson | |
| 9,302,719 B1 * | 4/2016 | Krishnan | B62D 33/0273 |
| 9,540,875 B2 | 1/2017 | Ellis | |
| 9,623,915 B2 * | 4/2017 | Worden | B62D 33/0273 |
| 2006/0261623 A1 * | 11/2006 | Kuznarik | B60R 3/02 |
| | | | 296/62 |
| 2008/0202850 A1 * | 8/2008 | Anderson | B60R 3/007 |
| | | | 182/106 |
| 2008/0232942 A1 * | 9/2008 | Ellingson | B66F 9/127 |
| | | | 414/347 |
| 2010/0096215 A1 * | 4/2010 | McFarlane | B60R 3/007 |
| | | | 182/106 |
| 2011/0168491 A1 * | 7/2011 | Cheatham, Jr. | E06C 7/182 |
| | | | 182/106 |
| 2012/0104721 A1 * | 5/2012 | Genest | B60R 3/02 |
| | | | 280/166 |

* cited by examiner

LOADING APPARATUS WITH PIVOTING HANDLE

TECHNICAL FIELD

The present examples relate generally to loading apparatus systems and designs, and more particularly, to a loading apparatus that may include stairs, a platform, and/or a handle, and may be used to load and unload cargo from a vehicle or other container.

BACKGROUND

Loading apparatus systems, particularly those requiring stairs, remain an area of interest. Some existing systems have various shortcomings, drawbacks, and disadvantages relative to certain applications. Accordingly, there remains a need for further contributions in this area of technology.

SUMMARY

A loading apparatus is provided that includes a set of stairs, a platform, and a handle. The stairs are attached to the platform and the platform has a locking mechanism. The handle has a first end that is pivotally attached to the set of stairs and the locking mechanism is capable of engaging the handle.

The methods and systems disclosed herein are nonlimiting and may be applied to other loading apparatus systems. Any appropriate number of stairs, platforms, and handles may be utilized in a given example. Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

DETAILED DESCRIPTION

Users of delivery vehicles may desire a safe and efficient way to load and unload cargo. There are a number of ways of doing so, including the use of ramps and stairs. Sometimes it may be desirable to use a set of stairs to unload cargo from a side or rear door of the delivery vehicle. Such stairs may be effective, but they can sometimes be dangerous if the person using the stairs does not have something to hold onto while ascending or descending the stairs.

Figure 1:
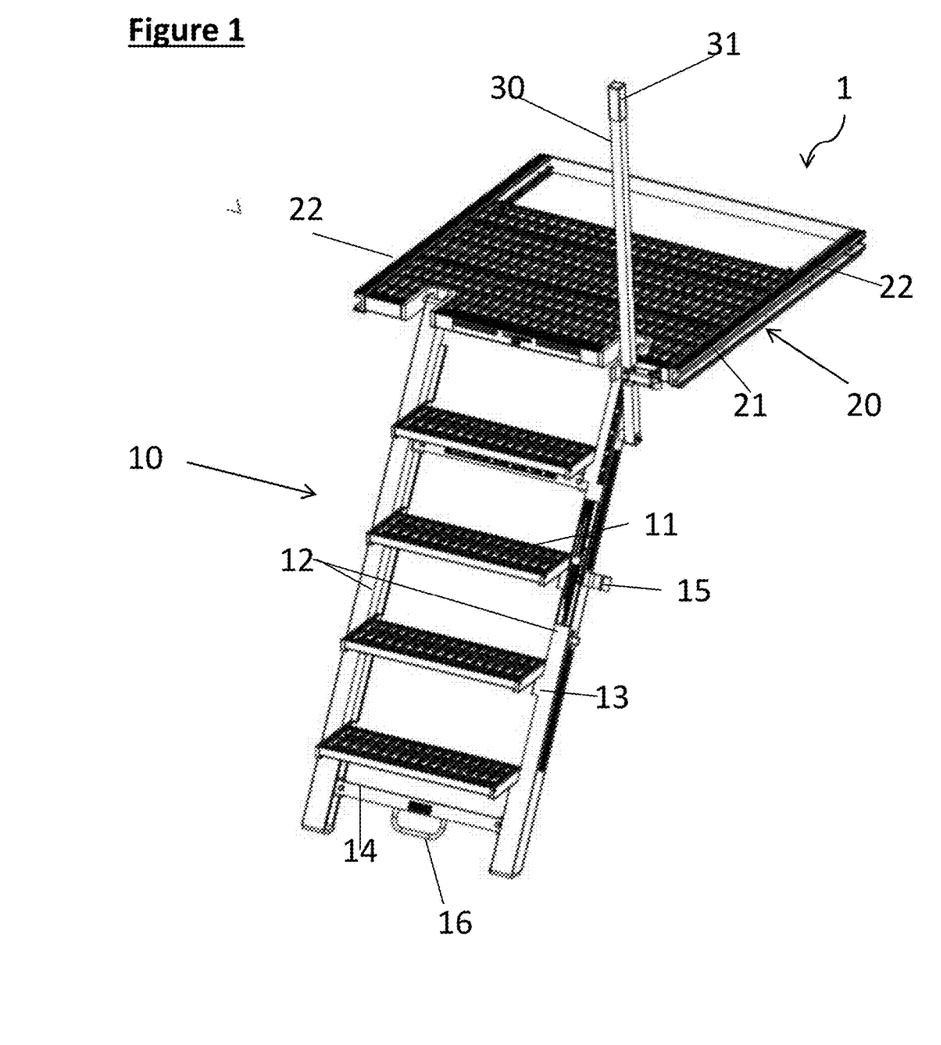
FIG. 1 depicts an example of a loading apparatus in an operational position.

A loading apparatus 1 is shown in FIG. 1. The loading apparatus 1 may include a set of stairs 10 and a platform 20.

Figure 2:
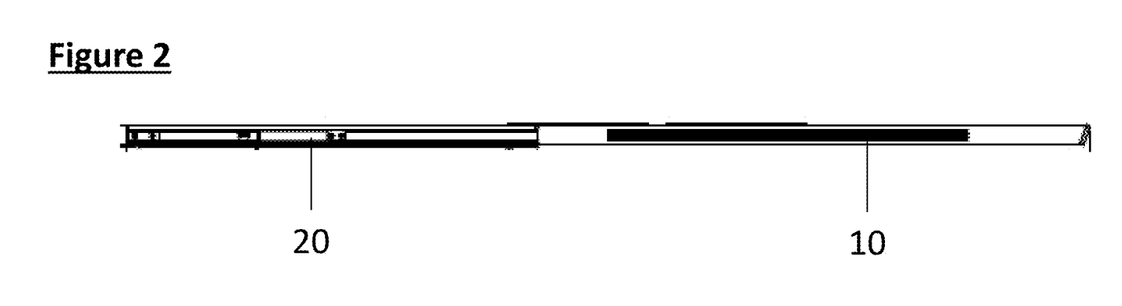
FIG. 2 depicts an example of a loading apparatus in a stored position.

The stairs 10 may include treads 11 that are disposed between a pair of risers 12. The treads 11 may be pivotally attached to the risers 12 so that the treads can be folded into a position that is parallel with the risers, as shown in FIG. 2. This may allow for a thinner profile when storing the stairs under the vehicle. The treads 11 may be constructed of a grill-type surface such as rectangular grating, diamond-cut grating, or other similar grating. In another example (not shown), the treads 11 may be continuous (no grating or holes) but may have a surface with a high coefficient of friction (e.g., surface treatment, naturally rough surface, etc.).

The risers 12 may include support tabs 13 on which the risers 12 may rest when in the operational position. The support tabs 13 may be integrally formed with the risers 12. The support tabs 13 may be positioned at a distance away from the pivot point of the treads 11 such that the treads 11 do not deform or buckle under the weight of a user.

The stairs 10 may be constructed from any appropriate material. For example, the stairs 10 may be constructed from light-weight aluminum, stainless steel, high-density polymer, or any other suitable material. The stairs 10 may be manufactured by any appropriate process, for example, extruding metal (e.g., extruded aluminum), injection molding, three-dimensional printing, and/or any other conventional method.

Figure 4:
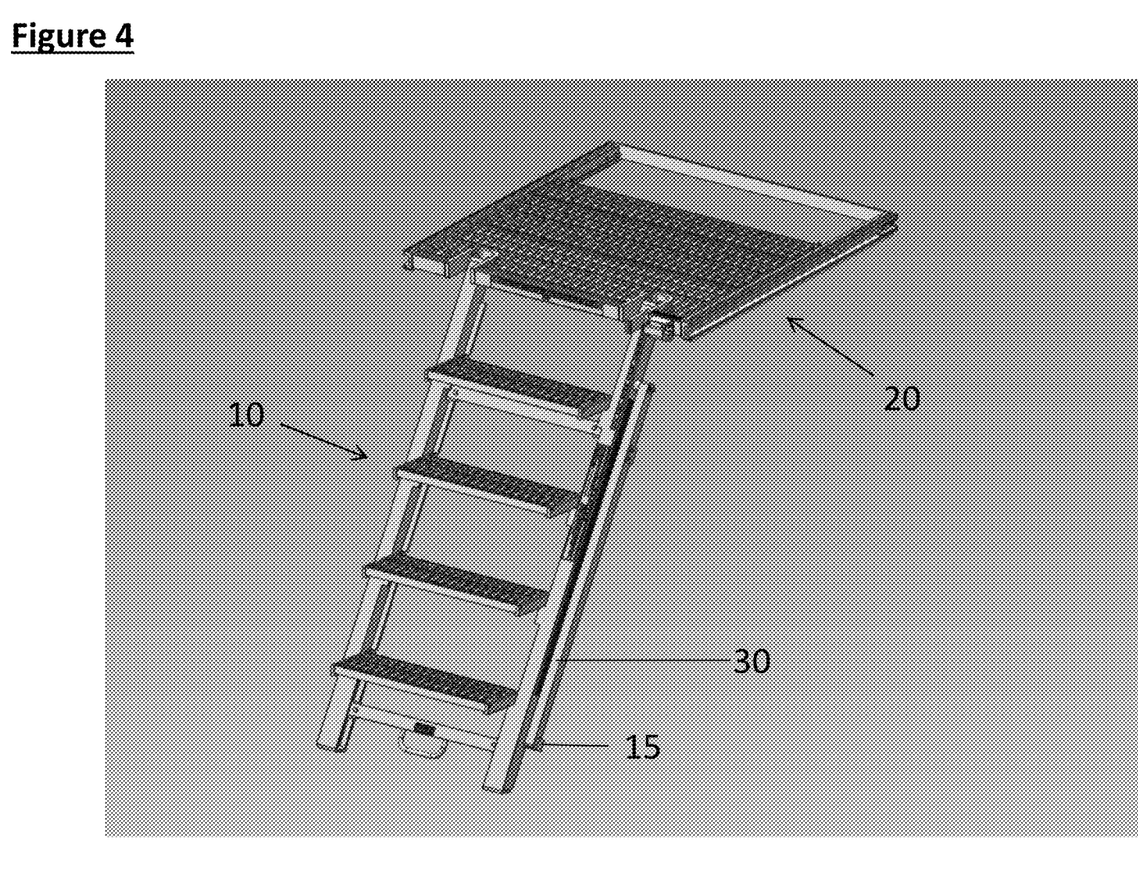
FIG. 4 depicts an example of a handle of a loading apparatus in a stored position.

The stairs 10 may include braces 14 to add stability to the stairs. The stairs may also include a clip 15 to secure the handle when the handle is in the stowed position (see FIGS. 1 and 4). The stairs may also include a grip 16 to assist in deploying the stairs from the stowed position to the operational position and vice versa.

The platform 20 may include a grill-type top surface 21 such as rectangular grating, diamond-cut grating, or other similar grating. In another example (not shown), the platform 20 may be continuous (no grating or holes) but may have a surface with a high coefficient of friction (e.g., surface treatment, naturally rough surface, etc.).

The platform 20 may be constructed from any appropriate material. For example, the platform 20 may be constructed from light-weight aluminum, stainless steel, high-density polymer, or any other suitable material. The platform 20 may be manufactured by any appropriate process, for example, extruding metal (e.g., extruded aluminum), injection molding, three-dimensional printing, and/or any other conventional method.

Figure 5:
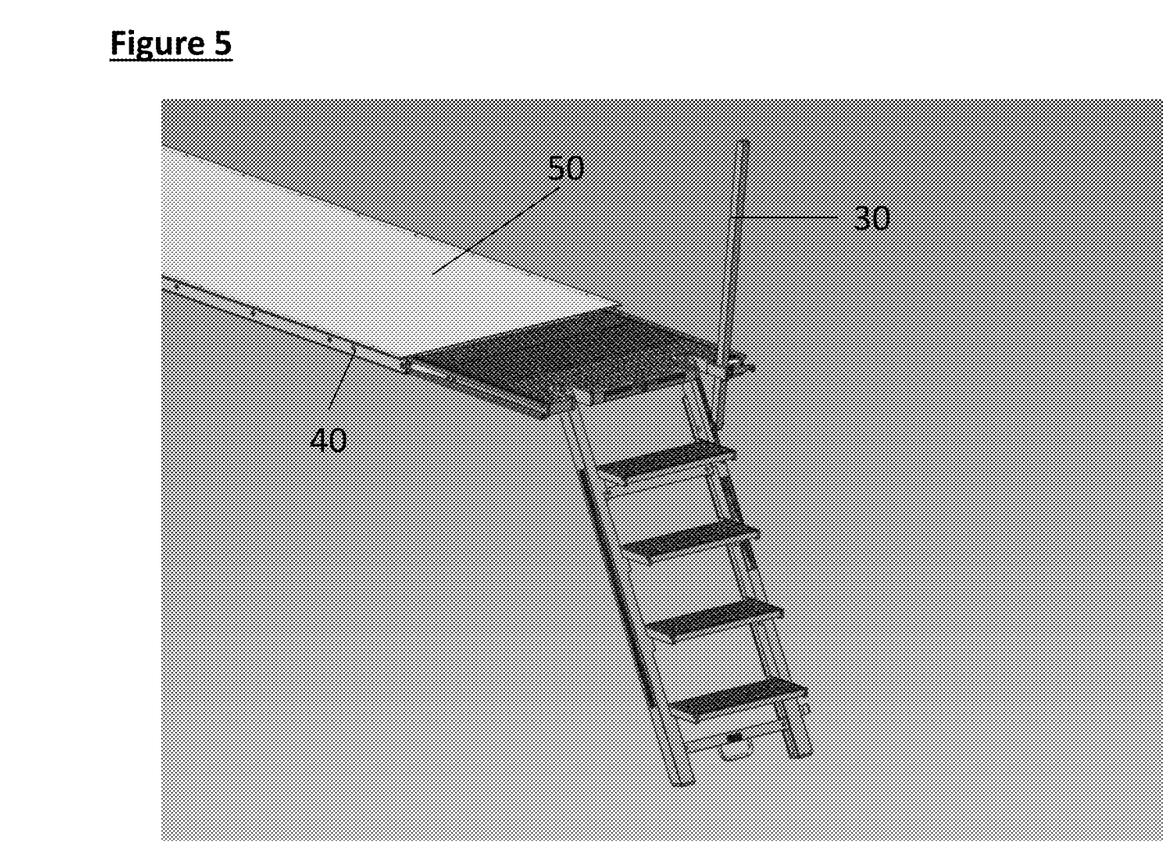
FIG. 5 depicts an example of a loading apparatus in an operation position.

When in the operational position, as shown in FIG. 5, the platform 20 may provide a transition from the trailer floor 50 to the stairs 10. The stairs 10 may be pivotally attached to the platform 20 using clevis pins and cotter pins (not shown).

The platform 20 may include a pair of rails 22. The rails 22 may be configured to cooperate and slide within a pair of tracks 40. Tracks 40 may be mounted under the floor 50 of a vehicle (not shown). The cooperation of the rails 22 and the tracks 40 permits the loading apparatus 1 to be stored under the vehicle when not in use and then slid into position and deployed into an operational position when desired.

The loading apparatus 1 may include a handle 30. As shown in FIG. 1, one end of the handle 30 may be pivotally attached to the stairs 10, for example one of the risers 12. The handle 30 (FIG. 1) may be attached to a riser 12 with a clevis pin and a cotter pin (not shown) to secure the clevis pin in place. The handle 30 may be attached to either side of the stairs 10 and the loading apparatus 1 may include a handle 30 on both sides of the stairs. The handle 30 may include a grip 31.

Figure 3:
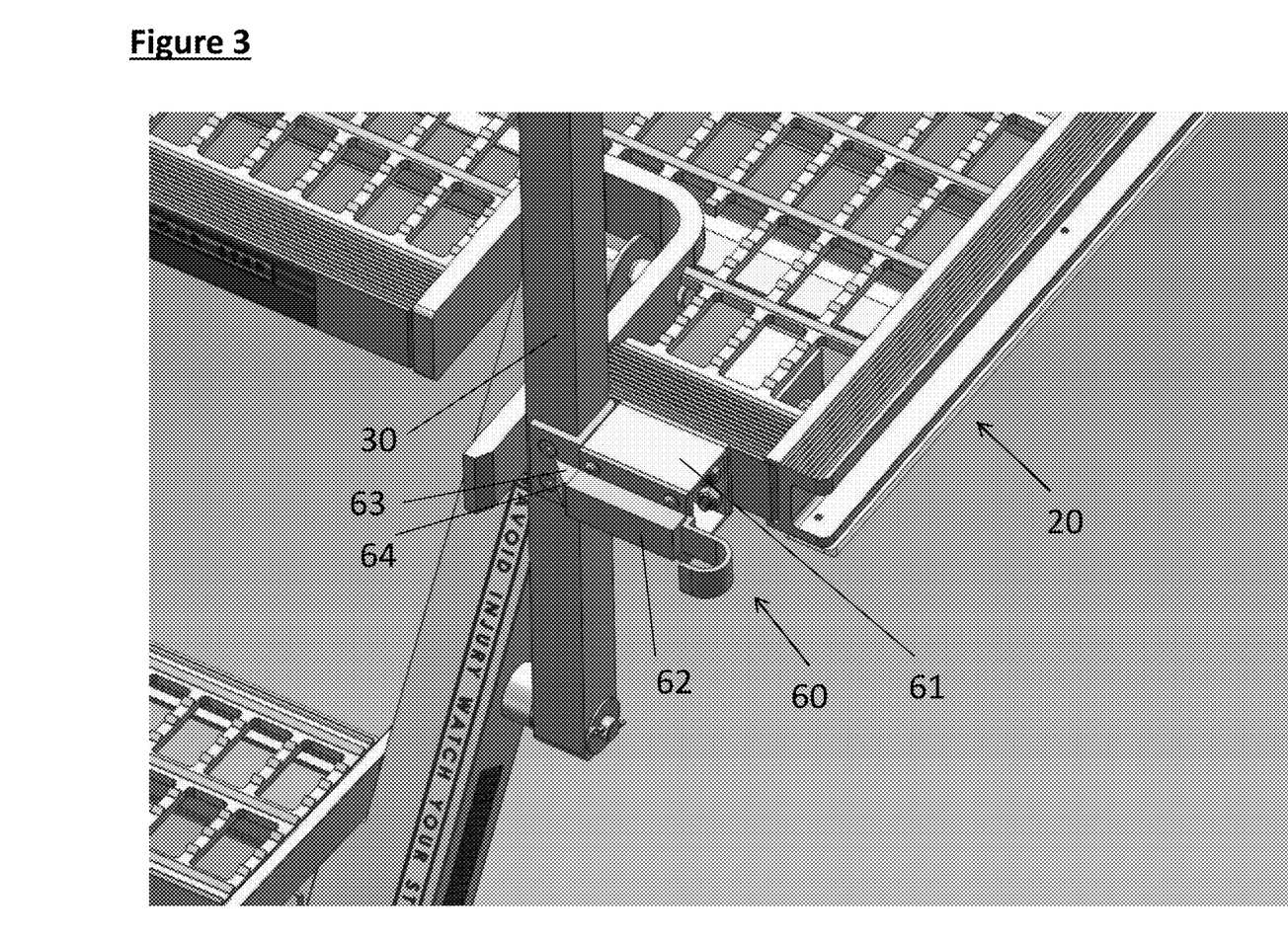
FIG. 3 depicts an example of a locking mechanism and a handle in an operational position.
Figure 6:
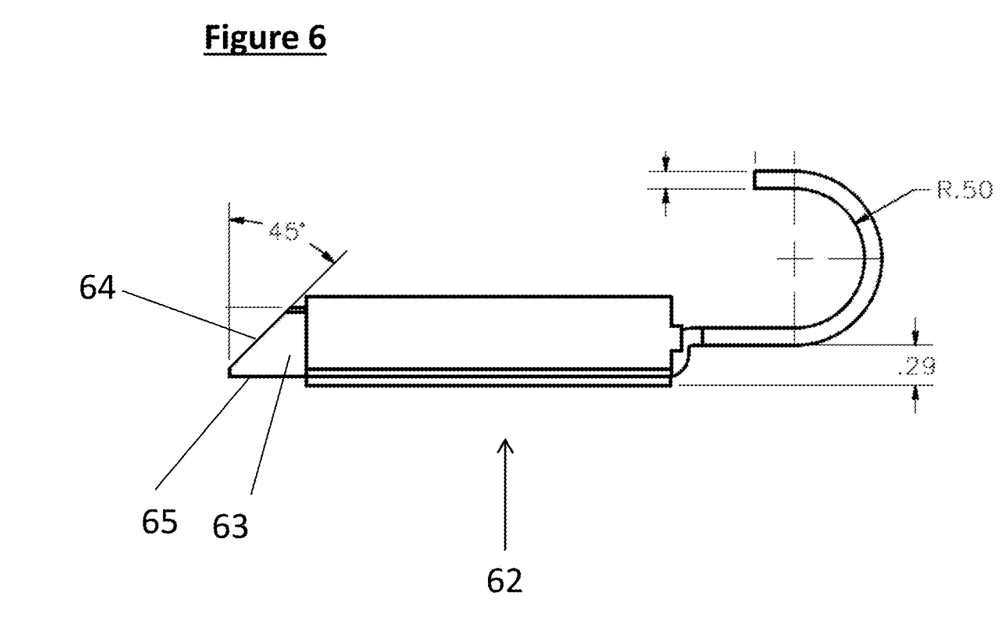
FIG. 6 depicts an example of a latch that may be used with an embodiment of a loading apparatus.

As shown in FIG. 3, a locking mechanism 60 may be attached to the platform 20. The locking mechanism 60 may include a bracket 61. A latch 62 may be attached to the bracket 61. The latch 62 may be a self-locking latch, as shown in FIG. 6. The latch 62 may include a locking bar 63 and may include a tensioned spring (not shown) that provides a lateral biasing force on the locking bar 63. In the example shown in FIG. 3, the latch 62 provides a left-ward biasing force on the locking bar 63. One end of the locking bar 63 may include an outwardly-facing angled face 64 and an inwardly-facing flat face 65 (see FIG. 6). An example of an acceptable latch is the EMC-565697 SS from Eberhard Manufacturing Co. (Strongsville, Ohio).

The handle 30 may be capable of rotating from a stowed position that is adjacent the stairs (see FIG. 4) into a vertically oriented operational position (see FIG. 5). The handle 30 may rotate upwards from the stowed position to the operational position such that the handle 30 contacts the angled face 64 of the locking bar 63 and forces the latch 62 open. In the example shown in FIG. 3, the locking bar 63 would move to the right, opposing the left-ward bias, into a biased position. When the handle 30 moves past the locking bar 63 such that the handle 30 no longer obstructs the locking bar 63, the biasing force (e.g., left-ward bias) may cause the locking bar 63 to move back into a closed position (e.g., locked position), and the inwardly-facing flat face 65 of the locking bar 63 may abut the handle 30, securing the handle 30 in place. The handle 30 may thus be securely positioned such that a user who seeks to ascend or descend the stairs may hold onto the handle 30 for safety, support, and/or to steady their progress. The user may optionally grasp the grip 31 of the handle 30.

In order to use the loading apparatus 1, a user may pull the loading apparatus 1 out from under the vehicle using the grip 16. The loading apparatus 1, including the stairs 10 and the platform 20, may slide on the rails 22, for example if the rails 22 are mounted under the vehicle. When the platform 20 is clear of the vehicle, the user may lower the free end of the stairs 10 to the ground. The user may then grasp the handle 30 and rotates it until it abuts the outwardly-facing angled face 64 of the locking bar 63 of the locking mechanism 60. The user may apply force to the handle 30, moving the handle 30 into the locked position of the locking mechanism 60, by pushing the handle 30 against the outwardly-facing angled face 64 of latch 62. The force of the handle against the latch 62 (in particular, the force against the outwardly-facing angled face 64 of the locking bar 63) may cause the latch 62 to slide laterally (e.g. to the right) out of the way so that the handle 30 can be seated inside the locking mechanism 60. After the handle 30 is seated inside the locking mechanism 60, the biasing force (e.g., left-ward) of the spring inside the locking mechanism 60 may force latch 62 back into place where it traps the handle 30 in place in the locked position. In the locked position, the handle 30 may abut the inwardly-facing flat face 65 of the locking bar 63 on the latch 62.

When the user is done using the stairs, the user may move the latch 62 into the biased position (e.g., to the right) out of the way so that the handle 30 may pivot freely away from the locking mechanism 60, thereby releasing the handle 30. The handle 30 may then be rotated back into its stowed/storage positon adjacent the stairs 10. The stairs 10 may be lifted into their stowage position and the loading apparatus 1 may be pushed back under the vehicle using the rails 22 and 40 for storage.

The loading apparatus 1 may be stored under a vehicle, for example a delivery vehicle. FIG. 5 depicts the loading apparatus 1 attached under the floor 40 of a delivery vehicle.

The disclosed examples provide many advantages. The pivot (clevis pin and a cotter pin) attaching the handle 30 to the risers 12 allows the handle 30 to move between fixed positions. The clip 15 provides a mechanism for securing the handle 30 during stowage/storage, while the locking mechanism 60 provides a mechanism for securing the handle 30 during operational use. The pivot (clevis pin and a cotter pin) attaching the stairs 10 to the platform 20 allows the stairs 10 to also move between fixed positions (e.g., stowage and operational positions). The treads 11 may also pivotally rotate between a stowed/storage position (where the first and second ends of the treads 11 are parallel with the risers 12) and an operational position (where the treads 11 are substantially parallel to the ground, and extending out from the risers 12). In the operational position, the treads 11 rest on the support tabs 13. Having these components all being capable of pivoting allows the loading apparatus 1 to move between a stowed/storage position and operational position in minimal time, thereby improving the efficiency of loading/unloading a vehicle or space.

Embodiments have been described herein in exemplary forms for instructing a person of ordinary skill in the art. Such embodiments and/or forms are not intended to limit the following claims to specific structures or steps. Other embodiments can be practiced and/or implemented without departing from the scope and spirit of the invention. Other embodiments are within the scope of the following claims.

The invention claimed is:

1. A loading apparatus comprising:
a set of stairs comprising at least two risers and a plurality of treads disposed between the risers;
a platform, wherein the set of stairs are attached to the platform and the platform includes a biased latch; and
a first handle having a first end, a second end, and a body portion therebetween, wherein the first end of the first handle is pivotally attached to the set of stairs and the biased latch engages the body portion of the first handle to secure the first handle in a deployed position while the set of stairs are also secured in a deployed position,
wherein the biased latch further comprises an outwardly-facing angled face and an inwardly-facing flat face,
wherein the biased latch is constructed and dimensioned such that during a locking step when the body portion of the first handle contacts the outwardly-facing angled face of the biased latch, the biased latch deflects from a resting position to a biased position.

2. The loading apparatus of claim 1, wherein the stairs are pivotally attached to the platform.

3. The loading apparatus of claim 1,
wherein at least one of the plurality of treads further comprises a first end and a second end,
wherein the first and second ends of the plurality of treads face opposite directions, and
wherein the first and second ends of the plurality of treads are pivotally attached to the risers.

4. The loading apparatus of claim 3,
wherein at least one of the plurality of treads is capable of pivoting between an operational position and a stowed position, and
wherein in the stowed position the first and second ends of the treads are substantially parallel with the risers.

5. The loading apparatus of claim 1, wherein the outwardly-facing angled face and the inwardly-facing flat face are on opposite sides of the biased latch.

6. The loading apparatus of claim 1, where the biased latch deflects back to the resting position when the body portion of the first handle does not obstruct the biased latch.

7. The loading apparatus of claim 1, further comprising:
a second handle having a first end, a second end, and a body portion therebetween, wherein the first end of the second handle is pivotally attached to the set of stairs; and
a second biased latch attached to the platform, wherein the second biased latch is constructed and dimensioned such that during a second locking step the second biased latch deflects from a resting position to a biased position to a resting position to secure the body portion of the second handle in a deployed position.

8. The loading apparatus of claim 1, wherein the biased latch is constructed and dimensioned such that during an unlocking step, the biased latch deflects from a resting position to a biased position.

9. The loading apparatus of claim 8, wherein the biased latch further comprises a grasping member.

10. The loading apparatus of claim 9, wherein the grasping member is a hook.

11. The loading apparatus of claim 1, wherein the biased latch further comprises a grasping member constructed and dimensioned such that during an unlocking step, the grasping member deflects from a resting position to a biased position.

12. The loading apparatus of claim 1, wherein the biased latch is constructed and dimensioned such that during a locking step the biased latch deflects from a resting position to a biased position to a resting position.

13. The loading apparatus of claim 12, wherein the locking step secures the first handle in the deployed position.

14. The loading apparatus of claim 1, wherein the biased latch engages an outer surface of the body portion of the first handle to secure the first handle in the deployed position.

15. The loading apparatus of claim 1, wherein the deflection of the biased latch is perpendicular to a plane of rotation of the first handle.

16. A loading apparatus comprising:
a set of stairs;
a platform attached to the set of stairs, wherein the platform includes a biased latch; and
a handle having a first end, a second end, and a body portion therebetween, wherein the first end of the handle is pivotally attached to the set of stairs and the handle is constructed and dimensioned such that in a storage configuration the handle is positioned substantially parallel to the set of stairs, and in an operational configuration the handle is positioned such that the biased latch engages the body portion of the handle to secure the handle in a deployed position while the set of stairs are also secured in a deployed position,
wherein the biased latch further comprises an outwardly-facing angled face and an inwardly-facing flat face,
wherein the biased latch is constructed and dimensioned such that during a locking step when the body portion of the first handle contacts the outwardly-facing angled face of the biased latch, the biased latch deflects from a resting position to a biased position.

17. The loading apparatus of claim 16, wherein the biased latch engages an outer surface of the body portion of the handle to secure the handle in the deployed position.

18. A loading apparatus comprising:
a set of stairs comprising at least two risers and a plurality of treads disposed between the risers;
a platform having a front edge and a rear edge, wherein the set of stairs are attached to the platform at a point between the front edge and the rear edge of the platform and the platform includes a locking mechanism attached to the front edge of the platform; and
a handle having a first end, a second end, and a body portion therebetween,
wherein the first end of the handle is pivotally attached to the set of stairs, and
wherein the locking mechanism engages the body portion of the handle to secure the handle in a deployed position while the set of stairs are also secured in a deployed position, and disengages the body portion of the handle while the set of stairs are in a stowed position,
wherein the locking mechanism further comprises an outwardly-facing angled face and an inwardly-facing flat face,
wherein the locking mechanism is constructed and dimensioned such that during a locking step when the body portion of the first handle contacts the outwardly-facing angled face of the locking mechanism, the locking mechanism deflects from a resting position to a deflected position.

\* \* \* \* \*